J. A. HORIGAN.
RESILIENT WHE
APPLICATION FILED MAY 24, 1913.

1,198,447.

Patented Sept. 19, 1916.

WITNESSES
J. L. Wright

INVENTOR
Joseph A. Horigan

UNITED STATES PATENT OFFICE.

JOSEPH A. HORIGAN, OF KANSAS CITY, MISSOURI.

RESILIENT WHEEL.

1,198,447.  Specification of Letters Patent.  Patented Sept. 19, 1916.

Application filed May 24, 1913. Serial No. 769,676.

*To all whom it may concern:*

Be it known that I, JOSEPH A. HORIGAN, a citizen of the United States, residing at Kansas City, in the county of Jackson and State of Missouri, have invented certain new and useful Improvements in Resilient Wheels, of which the following is a specification.

My invention relates to resilient wheels and tires for automobiles and other vehicles, and one of its objects is to provide a construction wherein the pneumatic tube is inclosed and guarded or protected against injury, and at the same time affords adequate elasticity and flexibility.

Another object of the invention is to provide an inner tube which is adapted to contract and expand, bellows-fashion, and to be reinforced against undue distention and liability of injury.

Still another object of the invention is to provide a construction wherein the inclosing casing for the tire is formed by telescopic channeled rim and tread sections, and wherein provision is made for preventing the tire from creeping or shifting therein.

Figure 2:
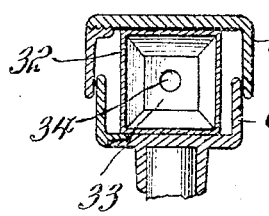
Figure 1:
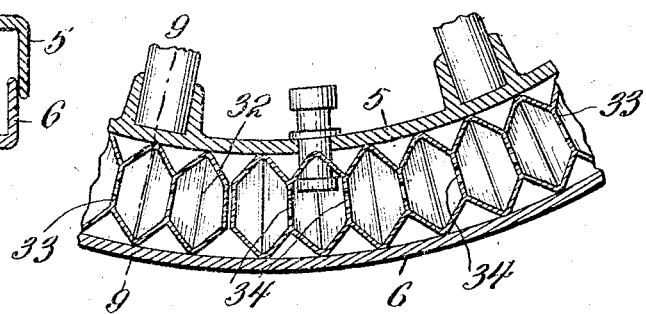
Figure 3:
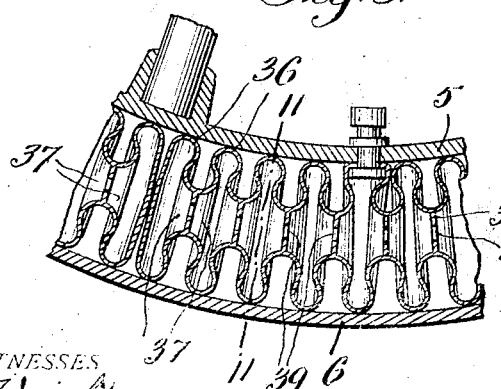
Figure 4:
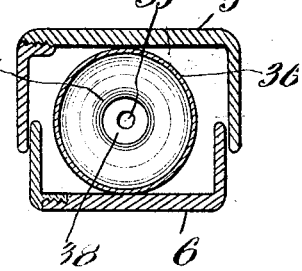

The invention consists of the features of construction, combination and arrangement of parts hereinafter fully described and claimed, reference being had to the accompanying drawings, in which:

Figure 1 is a longitudinal section, showing one form of construction. Fig. 2 is a transverse section on line 9—9 of Fig. 1. Fig. 3 is a longitudinal section, showing a modified form of construction. Fig. 4 is a transverse section on line 11—11 of Fig. 3.

In carrying my invention into practice, I provide a resilient wheel comprising an inner rim section 4 suitably fixed to the spokes and an outer rim section 5. Each of these rim sections is of channeled form, the side flanges of said sections being arranged to overlap so as to have a yielding telescopic action in the travel of the wheel over pavements, roads and other surfaces. Preferably each rim section 4 and 5 is in the form of a two-part structure, having a fixed flange 6 at one side and a removable flange 7 at the opposite side, which removable flange may be threaded or otherwise detachably connected with the body of the rim section. The rim as thus constructed provides a yielding or telescopic casing for an inclosed pneumatic tube, tire or cushion 8, the flanges 7 being made detachable for the ready and convenient insertion and removal of said tube. Preferably, as shown, the flanges 6 and 7 of the outer rim section 5 overlap the corresponding flanges of the fixed rim section 4, but the reverse may be the case under some conditions of service.

In the preferred form of my invention shown in Figs. 1 and 2 the tube 31 comprises bags, cells or sack-like sections 32 of suitable form in longitudinal section united at their ends and having intervening webs, partitions or diaphragms 33 provided with contracted air passages 34. The angular ends of these cells or sections, which are yieldingly linked together, form accordion plaited or bellows-like walls to permit contraction and expansion of said cells or sections.

In the modified form of my invention shown in Figs. 3 and 4 the tube 35 comprises hollow, disk-like annular cells 36 provided with central nipples 37 yieldingly united and linked together by webs, diaphragms or partitions 38 provided with contracted air passages 39. The opposed surfaces of these cells, together with their connecting nipples, form accordion plaited or bellows-like walls which are adapted to permit contraction and expansion of said cells.

The pneumatic tube, tire or cushion 31 or 35 is in the form of a ring or annulus occupying the chamber or channel formed by the rim sections, and may be filled with air whenever required through a suitable nipple or filling inlet 9. By this means, when any portion of the outer or tread rim section 5 comes in contact with the ground and sustains the weight of the load, the relative inward movement of such portion of the tread rim section will cause the air tube to collapse, the tube expanding as soon as the pressure is released therefrom, whereby the cushioning action similar to that afforded by the ordinary pneumatic tire is secured. It will be apparent that this tube is inclosed or housed in a rim casing, which may be made of metal or other suitable hard and durable material, whereby the tube is protected from puncture, sustained against disruption from "blow-outs" and against other injuries liable to impair its efficiency.

I claim:

1. In a tire, a pneumatic tube comprising a series of integral bellows-like cells, each having reduced end walls with a single wall forming the end walls of adjacent cells, with said end walls provided with apertures forming communication between adjacent cells.

2. In a tire, a pneumatic tube having bellows-like side walls forming a series of cells in the tube, communication between adjacent cells being established by passages formed in the walls thereof, the cells being spaced by single walls with the end walls of the end cells of the tube adapted to abut each other, and a shoe having the said tube inclosed therein.

In testimony whereof I affix my signature in presence of two witnesses.

JOSEPH A. HORIGAN.

Witnesses:
  BESS M. LEWIS,
  H. M. PINKERTON.